United States Patent Office 3,468,861
Patented Sept. 23, 1969

3,468,861
1-CYANOCYCLOBUTENE MONOMER AND POLYMER AND THEIR PREPARATION
Raymond F. Tietz, Greenmeadow, and William G. Kenyon, Wilmington, Del., assignors to E. I. du Pont de Nemours and Company, Wilmington, Del. a corporation of Delaware
No Drawing. Filed Dec. 6, 1966, Ser. No. 599,402
Int. Cl. C08f 3/74; C07c 121/48
U.S. Cl. 260—88.7                   3 Claims

ABSTRACT OF THE DISCLOSURE

The compound 1-cyanocyclobutene and its homopolymer are described. The preparation of 1-cyanocyclobutene by the dehydration of 1-carbamoylcyclobutene in the presence of a strong dehydrating agent at elevated temperatures is described. The homopolymer is prepared by a free radical initiated reaction. The homopolymer is a tough, high-melting polymer than can be shaped or formed into a film.

---

This invention is concerned with a new polymerizable organic compound, its homopolymer, and a process for its preparation.

More specifically this invention is directed to 1-cyanocyclobutene, a process for its preparation by dehydration of 1-carbamoylcyclobutene and its homopolymer.

1-cyanocyclobutene is a colorless liquid having a refractive index $n_D^{25} = 1.4560$. In carbon tetrachloride solution it shows a strong infrared absorption at 2240 cm.$^{-1}$. in the absence of stabilizers, it slowly polymerizes spontaneously at room temperature. This polymerization can be accelerated by the addition of free radical-type catalysts and inhibited by the addition of free radical inhibitors such as hydroquinone, with or without an added acid such as p-toluenesulfonic acid or sulfamic acid. The spontaneous polymerization is not so rapid that the monomer cannot be handled for analysis or for reaction with other compounds. It is stable in the monomer form at room temperature if used within a reasonable time.

The preparation of 1-cyanocyclobutene from carbamoylcyclobutene is effected by the action of at least one molecular equivalent of a strong dehydrating agent. Suitable agents include phosphorus pentoxide, phosphorus oxychloride, thionyl chloride, and the like. The reaction is preferably carried out at temperatures in the range of 100–300° C. and at pressures equal to or less than atmospheric pressure. A liquid reaction medium which is inert to the reactants and products may be employed if desired. Preferably, however, no additives are used. The reaction may be carried out in the presence of air, but it is preferred to effect it in the substantial absence of molecular oxygen, such as by operating at reduced pressures, or in an inert atmosphere, such as nitrogen, helium, or the like.

The homopolymer of this invention can be prepared in bulk, in dispersion, in emulsion, or in solution in an inert organic solvent at a temperature of $-100°$ to $160°$ C., and preferably in the presence of a free radical-generating initiator. Pressures above and below atmospheric pressure are operable; however, atmospheric and superatmospheric pressures are preferred.

Suitable solvents and/or dispersion media for the free-radical polymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. As indicated above, it is not essential that a solvent or dispersion medium be used, and bulk polymerizations can be carried out.

The free radical-generating initiators may be selected from a wide variety of compounds representative of this type of initiator. Included are the azo initiators, for example, $\alpha,\alpha'$-azodiisobutyronitrile, 1,1'-azodicyclohexanecarbonitrile, dimethyl $\alpha,\alpha'$-azodiisobutyrate, and $\alpha,\alpha'$-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the monomer being polymerized. Other sources of free radicals for initiating polymerization may also be used such as electron bombardment, ultraviolet light in the presence of a sensitizer, and the like.

Reaction times for preparing the homopolymer from 1-cyanocyclobutene can vary from a few seconds (i.e., 5) to several days, for example, two to three days or more, depending on the initiator, solvent, and the reaction temperature employed.

The resulting homopolymer contains 1,2-cyclobutane units arranged in more than one spacial configuration, i.e., the cyano group or the cyclobutane ring may be positioned cis or trans and the monomer units arranged head to head or tail to tail. Thus, varying forms and degrees of crystallinity are possible and the polymer may be isotactic, syndiotactic, and the like. All of these polymeric configurations are included within the scope of this invention.

The examples which follow exemplify the invention in greater detail. Parts are by weight unless otherwise indicated.

EXAMPLE 1

Part A

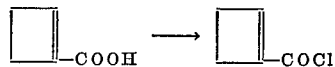

In a glass reactor fitted with a reflux condenser, a mixture of 6 g. of freshly prepared 1-cyclobutenecarboxylic acid (Campbell and Rydon, J. Chem. Soc., 1953, 3002–8) and 2.8 g. of phosphorus trichloride was heated on a steam bath for 15 minutes and then allowed to stand overnight at room temperature. The upper layer of the two-layer product was separated, treated with 0.6 g. of cuprous chloride and distilled under reduced pressure to obtain 3.8 g. of 1-cyclobutenylcarbonyl chloride, B.P. 44–48° C./14 mm.

Part B

1-cyclobutenylcarbonyl chloride (3.8 g.) was added dropwise to a stirred ethereal ammonia solution maintained at $-78°$ C. The ether and ammonia were then evaporated, and the residue washed with water and dried to afford 0.45 g. of 1-cyclobutenylcarboxamide, M.P. 164–165.5° C.

Part C

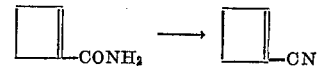

1-cyclobutenylcarboxamide (250 mg.) and phosphorus pentoxide (1 g.) were charged to a microflask, which was fitted to a distilling head and flushed with nitrogen. The reaction mixture was slowly heated to 150° C. at 30 mm. distilling 1-cyanocyclobutene as a clear, water-white liquid which collected in a chilled receiver. A portion of the distillate was dissolved in carbon tetrachloride and analyzed by infrared and n-m-r spectroscopy. The infrared spectrum exhibited a strong band at 2240 cm.$^{-1}$ (CCl$_4$). The n-m-r spectrum (CCl$_4$ solution) showed peaks at 7.47, 7.40, 7.36, and 7.34$\tau$, 7.23, 7.17, and 7.2$\tau$, and 3.32, 3.30, and 3.28τ, with areas in the ratio of 2:2:1. The above preparation was repeated and the product analyzed.

*Analysis.*—Calcd. for $C_5H_5N$: C, 75.92; H, 6.37; N, 17.71. Found: C, 75.31; H, 6.44; N, 16.64.

EXAMPLE 2

A sample of 1-cyanocyclobutene prepared as in Example 1 was divided into two portions. To the first portion about 2% of hydroquinone and a small amount of toluene sulfonic acid, an acidic inhibitor, was added. It remained liquid at room temperature indefinitely. The second portion was allowed to stand at room temperature. Within one hour it had polymerized spontaneously, yielding a tough, cream-colored, high-softening solid polymer.

The monomer of this invention is useful in preparing the homopolymer and the homopolymer is useful in polymer applications where toughness and high-melting properties are needed. For example, the polymer can be shaped in bulk for use in plastic toys, dishes and the like. It can form tough films for use in polymeric film applications.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:
1. 1-cyanocyclobutene.
2. The compound of claim 1 admixed with a polymerization inhibitor present in an amount of not more than 2 percent by weight of the total mixture.
3. The homopolymer of the compound of claim 1.

References Cited
UNITED STATES PATENTS

| | | | |
|---|---|---|---|
| 2,995,543 | 8/1961 | Williams | 260—88.7 |
| 3,182,046 | 5/1965 | Schmitt | 260—88.7 |
| 3,336,354 | 8/1967 | Greene et al. | 260—464 |

HARRY WONG, JR., Primary Examiner

U.S. Cl. X.R.

204—159.22, 159.23; 260—464